United States Patent Office 2,836,570
Patented May 27, 1958

2,836,570

CATALYST STONES FOR THE DECOMPOSITION OF CONCENTRATED HYDROGEN PEROXIDE

Charles Hargrave Peers, Enfield, England, assignor to the Minister of Supply in Her Majesty's Government of the United Kingdom of Great Britain and Northern Ireland, London, England No Drawing. Application May 22, 1953
Serial No. 356,875

7 Claims. (Cl. 252—441)

This invention relates to the manufacture of catalyst stones for the decomposition of hydrogen peroxide, more particularly for use in pressure gas generator units and thrust units.

Solid catalysts for the decomposition of concentrated hydrogen peroxide are subjected to severe thermal and mechanical shocks in use in such units. Temperature rises of from atmospheric to about 500° C. occur at the start and any looseness in packing of the catalyst units tends to result in destructive "chattering" by which abrasion and breakage may occur.

For a satisfactory pressure gas generator unit or thrust unit, no change in the resistance of the catalyst charge with respect to gas flow due to breakage should occur and debris from the solid catalyst in the gaseous decomposition products should be avoided as much as possible.

It is therefore desirable that the catalyst should be in a form having a high mechanical strength, so as to be substantially unaffected by the conditions existing in use.

Known types of solid catalysts owe their mechanical strength to various causes. For example, increased strength may be obtained by admixture with a cement, by compound formation, by impregnation on a carrier substance or by coating on a metal in the massive form.

It has been proposed to produce catalysts of great mechanical strength for the dehydrogenation of hydrocarbons, without the employment of separate solid carriers, by combining with the catalyst two or more substances, one basic and another a metal oxide inter alia lead oxide, capable of reacting with each other when moulded and heated to at least 1600° F., to form a solid supporting compound of high mechanical strength, see for example British Patent No. 485,178 and also British Patent No. 489,551.

An object of the present invention is to provide catalyst stones in a highly robust and abrasion-resistant form suitable for use in pressure gas generator units and thrust units for the decomposition of concentrated hydrogen peroxide.

The present invention provides a process for the manufacture of robust abrasion-resistant catalyst stones for the decomposition of hydrogen peroxide, wherein a mixture of which at least one component is a catalytic material capable of decomposing hydrogen peroxide or is a substance which when decomposed by heat yields the same, and another component is a substance which when sintered at high temperature will act as a binder, for example lead monoxide, is formed into pellets, cubes or the like shaped bodies with the aid of a refractory cement such as Portland cement which acts as a temporary binder, the pellets are allowed to dry and harden and are finally strongly heated to sinter the binder for example lead oxide but without fusing the whole of the pellets.

The initial mixture preferably contains a mixture of lead monoxide and dioxide which when sintered acts as a catalytically active binder, in which case a temperature of about 900° C. is suitable for the sintering operation.

Salts which are soluble under the conditions existing during the decomposition of hydrogen peroxide solution and which are reactive therewith may be incorporated in the catalytic mixture. Such substances for instance potassium iodide, potassium chromate, or potassium permanganate or mixtures thereof give a catalyst having a high initial activity and subsequently an increased porous structure.

The mixture containing catalytic material should be such that it is not wholly fused at the temperature employed in the sintering operation and preferably includes catalytically active substances such as manganese dioxide or black cobalt oxide which do not fuse during the sintering operation and are not soluble under the conditions of reaction.

The formation of the pellets, cubes or like solid bodies with the aid of a refractory cement such as Portland cement which acts as a temporary binder for the catalyst material enables them to be handled without crumbling before the sintering operation. After sintering the cement loses its binding properties and acts as an inert filler material.

A small proportion of free alkali is advantageously employed in the catalyst stones. The alkali acts as a destabiliser rendering the hydrogen peroxide solution alkaline, and allowing decomposition to occur more readily.

Potassium permanganate may be conveniently incorporated in the catalytic material as a source of free alkali; during the sintering operation it is at least partially decomposed into free alkali and manganese dioxide among other products and thus acts both as a destabilizer and a catalyst.

In order that the invention may be readily understood and carried into effect, the same will now be described with the aid of the following examples:

*Example I*

Two mixes are made up as follows:

*Mixture I.*—1500 gms. of potassium permanganate, 1500 gms. of potassium chromate and 1500 gms. of potassium dichromate, all in finely crystalline form, are thoroughly mixed and formed into a paste with 1,250 cc. of 30% potassium hydroxide solution, 1500 gms. of solid potassium hydroxide in the form of flakes or pellets are then mixed in and the mass allowed to cool.

*Mixture II.*—5,000 gms. of litharge and 5,000 gms. of lead peroxide are mixed to a cream with 2,500 cc. of 30% potassium hydroxide solution. 4,000 gms. of Portland Super Cement are then made into a cream with 2,500 cc. water, and mixture I is mixed in immediately, followed rapidly by mixture II.

The mass is then spread on trays and cut into small cubes when sufficiently hard and set. After a period of one or two days to allow further hardening to permit handling, the cubes are separated.

The cubes are then aged for from one to five days and heated for one hour at 900° C. in a muffle furnace to consolidate them by sintering at least a part of the lead oxide.

Shrinking occurs due to the heat treatment, for example, the size of a cube will reduce from 8 mm. a side to about 6.5 mm. a side.

*Example II*

Two mixes are made up as follows:

(1) 200 gms. cobalt oxide (black), and 200 gms. of lead monoxide are mixed with 120 cc. water to form a cream.

(2) 100 gms. Super Cement are mixed into a cream with 55 cc. of water. The water may be replaced by alkali hydroxide solution, e. g. 30 percent potassium hydroxide.

The two mixes are then mixed together and the product formed into cubes as in the foregoing example, and the cubes heated at about 900° to sinter the lead oxide as binder.

Catalyst stones prepared in accordance with the invention maintain an exceptionally high degree of strength during usage as well as giving a high rate of decomposition of hydrogen peroxide solution.

I claim:

1. Process for production of robust abrasion-resistant catalyst stones for the decomposition of hydrogen peroxide which comprises forming a paste from a mixture comprising substantially equal proportions of at least one substance selected from the group consisting of potassium iodide, potassium permanganate, potassium chromate and potassium dichromate, and lesser proportions of lead peroxide, lead monoxide and an inert refractory cement and water, shaping the paste into pellets, allowing the pellets to dry and harden, and finally consolidating the pellets by heat treatment to sinter the lead oxides to form a catalytically active binder.

2. Process for the production of abrasion-resistant catalyst stones for the decomposition of hydrogen peroxide, capable of withstanding severe thermal and mechanical shocks, which comprises forming a paste from a mixture comprising substantially equal proportions of an alkali-metal permanganate, a lead oxide and lesser proportions of an alkali metal hydroxide, an inert refractory cement and water, shaping the paste into pellets, allowing the pellets to dry and harden and finally consolidating the pellets by heat treatment to sinter the lead oxide to form a catalytically active binder.

3. Process for the production of abrasion-resistant catalyst stones for the decomposition of hydrogen peroxide, capable of withstanding severe thermal and mechanical shocks, which comprises forming a paste from a mixture comprising substantially equal proportions of cobaltic oxide and a lead oxide, and lesser proportions of an alkali metal hydroxide, an inert refractory cement and water, shaping the paste into pellets, allowing the pellets to dry and harden, and finally consolidating the pellets by heat treatment to sinter the lead oxide to form a catalytically active binder.

4. The process for preparing abrasion-resistant catalyst stones for the decomposition of hydrogen peroxide, capable of withstanding severe thermal and mechanical shocks which comprises forming a paste from a mixture comprising a substantial proportion of a substance reactive with hydrogen peroxide in solution and a lead oxide and lesser proportions of an inert refractory cement and water, said cement to serve as a temporary binder, shaping the paste into pellets, allowing the pellets to dry and harden and consolidating the pellets by heat treatment to sinter the lead oxide to form a binder.

5. Catalyst stones for the decomposition of hydrogen peroxide prepared according to the method of claim 1, which consist of sintered solid bodies comprising catalytic material for the decomposition of hydrogen peroxide selected from the group consisting of potassium iodide, potassium permanganate, potassium chromate and potassium dichromate and minor proportions of an alkali metal inert filler material formed from an inert refractory cement and lead oxide as a catalytically active sintered binder.

6. Catalyst stones for the decomposition of hydrogen peroxide prepared according to the method of claim 2, which consist of sintered solid bodies comprising major proportions of potassium permanganate and manganese dioxide and minor proportions of potassium hydroxide, inert filler material formed from an inert refractory cement and a binder comprising sintered lead oxide.

7. Catalyst stones for the decomposition of hydrogen peroxide prepared according to the method of claim 3, formed as sintered solid bodies comprising substantially equal proportions of cobaltic oxide and lead oxide and lesser proportions of an inert refractory cement and a catalytically active sintered binder.

References Cited in the file of this patent

UNITED STATES PATENTS

| 1,233,415 | Steinberg | July 17, 1917 |
| 1,239,125 | Parsons | Sept. 4, 1917 |
| 1,379,221 | Scott et al. | May 24, 1921 |
| 1,970,695 | Freyermuth | Aug. 21, 1934 |
| 2,439,538 | Burgess | Apr. 13, 1948 |
| 2,460,811 | Davies et al. | Feb. 8, 1949 |

FOREIGN PATENTS

| 489,551 | Great Britain | July 28, 1938 |

OTHER REFERENCES

Zucrow: Journal of the American Rocket Society, No. 72, December 1947, page 28.